United States Patent [19]
Smith

[11] Patent Number: 5,143,177
[45] Date of Patent: Sep. 1, 1992

[54] TREE STAND

[76] Inventor: Terry B. Smith, 1760 Hubert Rd., Midland, Mich. 48640

[21] Appl. No.: 802,854

[22] Filed: Dec. 6, 1991

[51] Int. Cl.⁵ ............................................ A01M 31/00
[52] U.S. Cl. .................................... 182/187; 182/136
[58] Field of Search ............... 182/187, 188, 189, 9, 182/128, 133, 134, 135; 108/152

[56] References Cited

U.S. PATENT DOCUMENTS

| | | | |
|---|---|---|---|
| 3,030,160 | 4/1962 | Tandy | 182/187 X |
| 3,392,802 | 7/1968 | Moore | 182/187 |
| 4,120,379 | 10/1978 | Carter | 182/187 |
| 4,409,907 | 10/1983 | Norton | 182/187 X |
| 4,452,338 | 6/1984 | Untz | 182/187 |
| 4,579,198 | 4/1986 | Lee | 182/187 X |
| 4,603,757 | 8/1986 | Hollinger | 182/188 X |
| 4,782,918 | 11/1988 | Brunner | 182/187 |
| 5,060,756 | 10/1991 | D'Acquisto | 182/187 |
| 5,086,874 | 2/1992 | Treants | 182/187 X |

*Primary Examiner*—Karen J. Chotkowski
*Attorney, Agent, or Firm*—Douglas N. Deline

[57] ABSTRACT

A tree stand comprising a stand portion adapted for releasable attachment to a loop formed from an elongated flexible member that is placed in circumferential relationship with a tree or post.

4 Claims, 2 Drawing Sheets

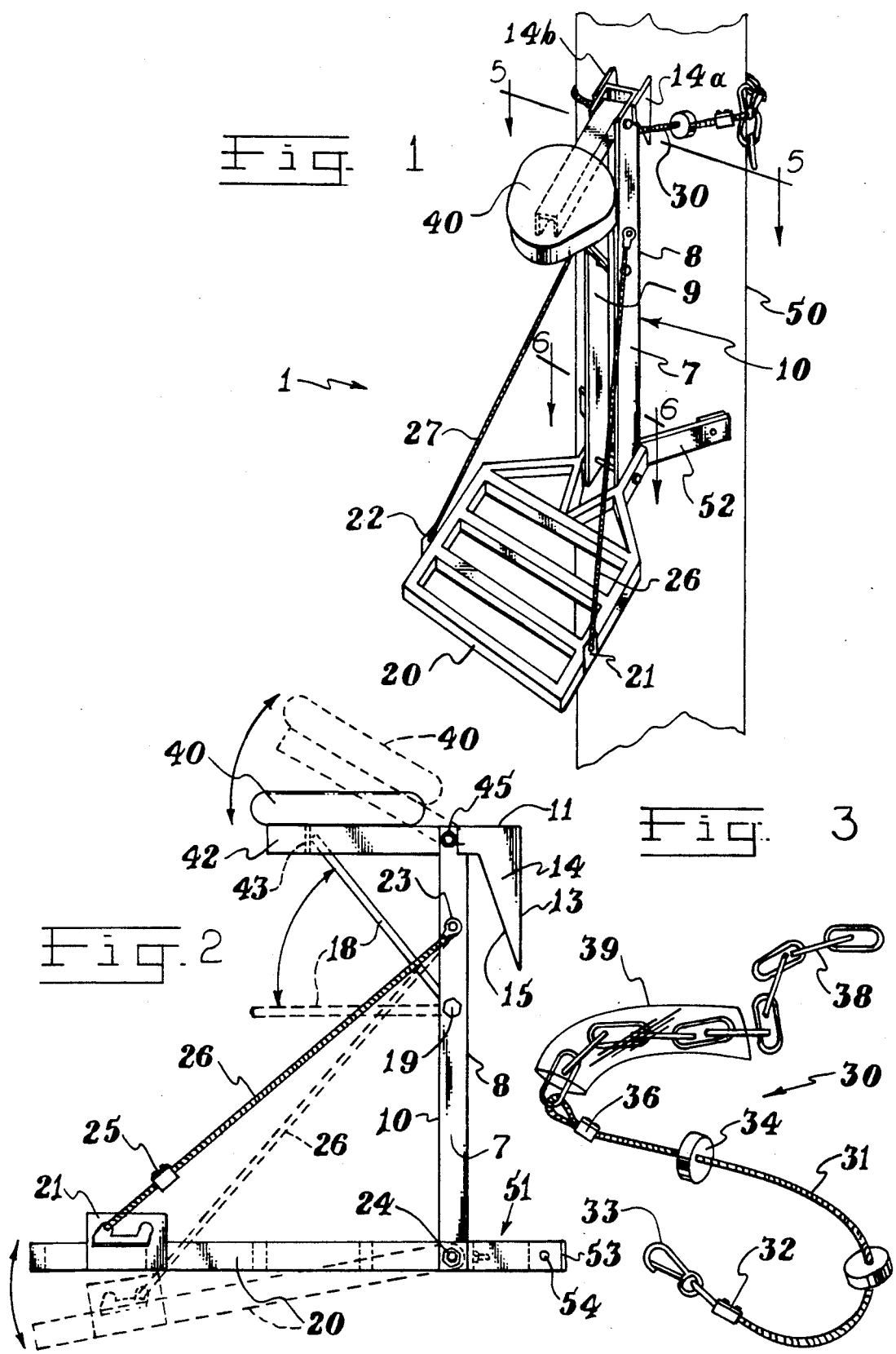

TREE STAND

BACKGROUND OF THE INVENTION

1. Field of the Invention

The present invention relates generally to a device intended for use by hunters, campers, sportsmen and the like and adapted to be readily attached to a tree, post, or other vertical support member to provide a platform, seat or combination of both at any desired level above the ground. Additionally the present device is adapted to avoid substantial injury to the surface of the tree, post or other vertical support member.

2. Description of the Prior Art

Numerous devices for attachment to trees and the like to provide an elevated observation or hunting stand have been previously disclosed in the art. Examples of such devices (hereinafter referred to as "tree stands") are disclosed in U.S. Pat. Nos. 4,722,421, 4,600,081, 3,854,551, 3,817,350 and elsewhere. Disadvantageously however, previous designs of tree stands often utilize sharp protrusions or separate threaded fastening devices such as a lag screw for securing or aiding in securing the stand to the tree or vertical supporting post. These fastening means can cause damage to the bark or surface of the tree or post to which the tree stand is attached and are undesirable for this reason. Also, the operator usually must carry the sharp lag screw up the tree trunk and attempt to tighten the same into the tree often under adverse working conditions while constantly in danger of falling and/or being injured by the sharp lag screw.

To avoid these problems, certain known designs of tree stand comprise a stand portion and a flexible support or binding means such as a belt, strap, chain or other restraining and supporting means to engage the circumference of the tree and support the stand. Because this flexible means remains attached to the stand it can only be placed in position in circumferential relation with the tree with some difficulty. That is, the person attaching the tree stand to the tree must carry the entire structure up the tree to the desired height and support the stand while attaching the flexible support means in circumferential relation with the tree. This procedure also exposes the individual to risk of falling or injury because of the need to both support the tree stand and manipulate the flexible support means to attach the tree stand to the tree trunk or post. Also, if the stand is to be reused on subsequent occasions in the same tree, the entire operation must be repeated each time the device is to be used. Additionally, applying tension to such flexible support means in order to secure the stand to the tree has previously been occasioned by operation of a turn buckle, ratchet means, or similar device operated by the individual. The amount of tension capable of being applied in this manner may not be sufficient to adequately secure the tree stand, resulting in dangerous tipping or shifting of the tree stand when in use.

SUMMARY OF THE INVENTION

The present invention avoids the above defects in prior art tree stands. In particular the present invention utilizes a separate flexible support means that is placed in loose circumferential relationship with the tree or other upright supporting member at the desired height. Thereafter, the stand is removable attached to the flexible support means. Thus the invention comprises in combination a flexible support means having one end adapted for attachment to itself to form a variable sized closed loop, and a stand adapted for releasable engagement with said loop. Desirably the stand is attached to such flexible member by sliding engagement with a tapered engaging means that causes the stand to press tightly against the tree as weight is placed on the stand, thereby securing the stand to the tree by frictional engagement. Thus, it is not necessary that the flexible support means be independently secured against downward motion with respect to the tree trunk. The stand may be easily detached, folded and transported until needed at a later time. The flexible support means may likewise be removed or may be left attached circumferentially to the tree making subsequent reattachment of the stand relatively easy.

The details of the preferred embodiments of the present invention together with its objects and advantages will be better understood from the following description taken in conjunction with the accompanying drawings wherein:

FIG. 1 is a perspective view of the stand attached to a tree by means of engagement with the flexible support means;

FIG. 2 is a side view in elevation of the stand showing the tapered engaging means for engaging the flexible support means, as well as the optional seat, the adjustable nature of the platform and seat being illustrated in phantom outline;

FIG. 3 depicts an embodiment of the flexible support means;

DETAILED DESCRIPTION

Figure 4:
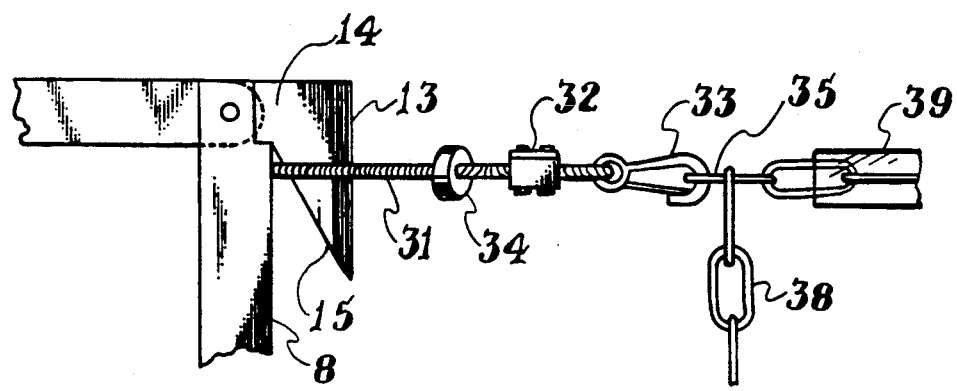
FIG. 4 is an enlarged, fragmentary, side view in elevation showing the flexible supporting means 30, in detail.

Referring to the drawings, it may be seen in FIG. 1 that the tree stand of the invention is comprised of two essential components: a flexible support or binding means 30, and a detachable stand portion 1, comprising a substantially vertically disposed support frame 10, which desirably is in the cross-sectional shape of a channel, having back surface 8, and sides 7 and 9, generally adapted to lie in substantially parallel relationship with the tree trunk or post 50, to which the tree stand is attached and rotatably connected at its lower end to a platform 20, adapted to project laterally in front of support frame 10. Platform bracing means 26 and 27, attached to adjustable connecting means 21 and 22, respectively, are also provided. An optional seat 40, is also depicted. The flexible support means and stand portion, or components thereof, may be constructed of metal, wood, plastic, or other suitable material.

In FIG. 2 it may be seen that the support frame 10, terminates at its upper extremity with an engaging means 14, adapted for detachably or releasably engaging the flexible support means. In the embodiment depicted, the engaging means comprises at least one wedge shaped or angle projection terminating in upper edge 11, rear edge 13, and tapered face 15. Rear edge 13, is in substantially parallel alignment with and spatially removed from back surface 8. Tapered face 15, extends from back surface 8, at a point below the intersection thereof with upper face 11, to the lower terminus of rear face 13. Application of downward force to the stand increasingly tightens the flexible member against tapered face 15, thereby causing rear edge 13, to press tighter against the tree or other upright support member. Rear edge 13, may be smooth or rough, for example grooved, to engage the tree surface better. The number of projections 14, and the thickness thereof may be selected to provide sufficient strength and stability and to avoid damaging the surface of the tree. That is, more projections or wider projections serve to reduce the force applied to the bark of the tree thereby avoiding damaging the tree. Projection 14, may be attached to support frame 10, by welding, riveting, use of a bolt and nut or any other suitable means. Referring back to FIG. 1, in a preferred embodiment, two projections 14a and 14b, that are spatially separated, substantially parallel to one another and attached to sides 7, and 9 are employed. Use of two projections provides increased stability to the stand by engaging the tree and flexible supporting means in two places.

At the lower extremity of support frame 10, an optional bracket means 51, further described hereafter, for engaging the tree is shown. Platform bracing means 26 and 27, connected to adjustable connecting means 21 and 22, for bracing the platform 20, and seat bracing means 18, abutting cross-member 43, of seat support 42, for bracing seat 40, are seen to be movable to accommodate different positions of the platform and seat. Surfaces of all portions of the stand in contact with other portions that might produce noise during setting up or use may be padded or cushioned with fabric or elastomeric material, if desired. Also, desirably, bracing means 26 and 27 are flexible cables, ropes or similar device, however it is to be understood that a hinged folding solid bracing means may also be employed is desired. The platform bracing means 26 and 27 are adjustable by means of the adjustable connecting means 21 and 22, so that the platform may be raised or lowered from the horizontal plane. The lengths of platform bracing means 26 and 27 are fixed and the upper ends thereof are attached to support frame 10, by attachment means 23, such as a swaged cable terminal, held by a bolt and nut passing through sides 7 and 9, to prevent warping or twisting of platform 20. The lower terminus of bracing means 26, is illustrated in the form of a loop held in place by a cable clamp or similar device. 25. The platform is rotatably attached to support frame 10, by means of a cylindrical connecting means 24, such as a bolt or rivet. The adjustable feature allows the stand to be used if the tree or post is not perfectly vertical or if the user desires the platform to be positioned at a level other than horizontal. For example when used for an archery stand, better balance is possible under some conditions if the front of the platform is lowered slightly below horizontal.

Seat support 42, is rotatably attached to support frame 10, near the upper extremity thereof by means of a fastening means 45, such as a bolt and nut, rivet or similar means. Thus seat 40, may be folded upward if not in use and to provide a more compact arrangement when stored or transported. Bracing means 18, serves to secure the seat in substantial horizontal position above the platform in front of support frame 10 when in use. The lower terminus of seat bracing means 18, is rotatably attached to support frame 10, by means of a bolt, rivet or similar means 19, passing through and securing the same to faces 7, and 9. Desirably, seat support 42, and bracing means 18, are attached to support frame 10, with sufficient frictional fit such that the seat will stay in the upright or vertical position and the bracing means will stay completely folded down inside the channel of support frame 10, when not in use, without moving, shifting or making noise.

In FIGS. 3 and 4 it may be seen that the flexible binding means may in one embodiment comprise a relatively thin portion 31, which may be for example a cable, wire or similar structure optionally coated with a protective finish or coating which allows the flexible binding means to freely slide over the tapered surface of the engaging means. Disposed along the flexible binding means may optionally be one or more flexible stand-offs 34, which initially contact the surface of the tree or post to hold the flexible binding means spatially separated therefrom. This permits easier engagement of the attachment means 14, with the flexible binding means. Upon application of weight or downward force to the stand, the flexible stand-offs compress, allowing contact of rear face 13, with the tree surface. The relatively thin portion 31, of flexible binding means 30, is formed into terminal loops by means of clamps 32 and 36, and attached at one terminus to a catch 33. The opposite end of the relatively thin portion 31, is attached to a chain or similar link containing member 38. A flexible protecting tube 39, made from soft plastic, rubber or similar material, may encase the flexible support means or at least the link containing portion thereof to prevent damage to the tree surface. Intermediate links of the link containing flexible portion 35, may be connected to catch 33 to form a loop having a size approximately equal to the circumference of the tree or post.

It is to be understood that the relatively thin portion of the flexible support means 31, may be omitted, if desired, without departing from the scope of the present invention. For example, the flexible binding means may in its entirety be a chain attached to catch 33, provided that the links of the chain are not too large to slide freely into the notch formed between the tapered surface 15, of engaging means 14, and the rear surface 8, of support frame 10.

Figure 5:
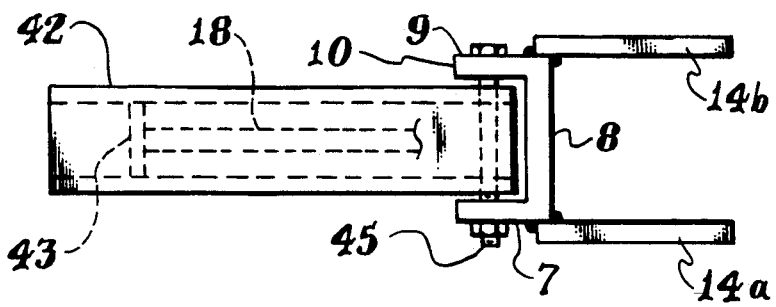
FIG. 5 is a fragmentary view in section and elevation along the line 5—5 of FIG. 1.

FIG. 5 depicts seat support 42, such as a channel of a width slightly narrower than that of support frame 10. Seat bracing means 18, abutting cross-member 43, is rotatably attached to support frame 10, by means of fastening means 19, such as a bolt passing transversely through the seat bracing means. It is understood that seat support 42 may be of any suitable shape or construction. As an alternative to the design illustrated seat support 42 may be in the form of two separate longitudinally projecting members having vertical faces adapted to attach by means of fastening means 45 to the outside surfaces of support frame 10. Seat 40, may be attached to seat support 42, by any suitable means, such as adhesives, screws, bolts, rivets, etc.

Figure 6:
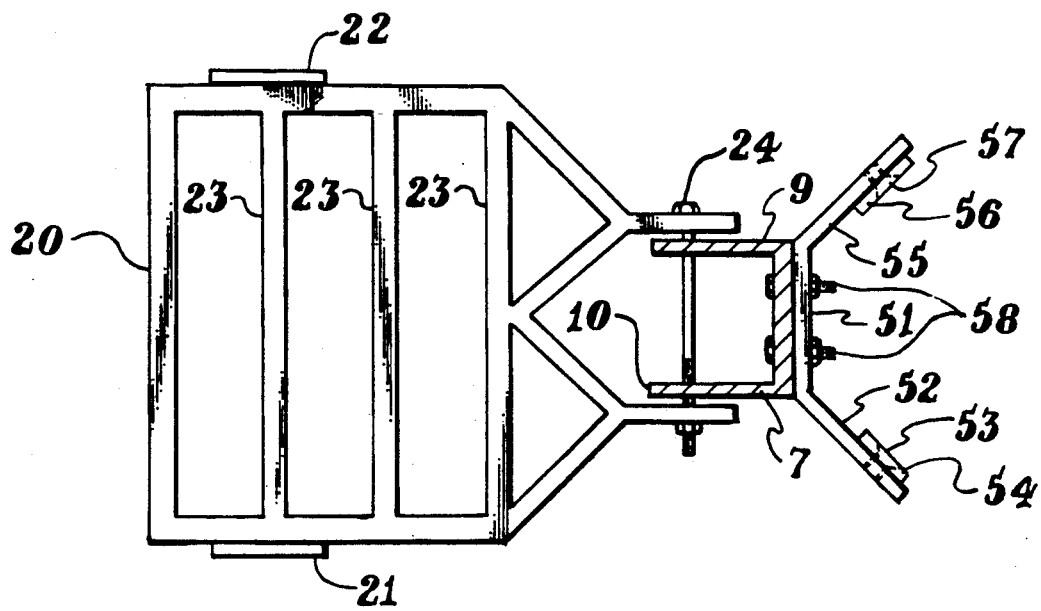
FIG. 6 is a fragmentary view in section and elevation along the line 6—6 of FIG. 1.

FIG. 6 depicts platform 20, showing a typical arrangement of spaced cross members 23, adjustable connecting means 21, and 22, and fastening means 24. It is to be understood that in an optional embodiment the platform could be utilized as a seat instead of providing a separate seat above the stand as depicted in FIG. 1. Further depicted in FIG. 6 is bracket means 51, comprising longitudinally juxtaposed projections 52 and 55. Mounted on the surface of projections 52 and 55 in contact with the tree are optional flexible pads 53 and 56. These pads are desired in order to prevent abrasion or cutting of the surface of the tree when the tree stand is in use, and are desirably made of an elastomeric material such as rubber. Pads 53 and 56, are held in place by fasteners 54 and 57, such as screws or rivets. Bracket means 51, is securely attached to support frame 10 by fasteners 58, or by welding, adhesives, etc. In addition it is to be understood that the entire exposed face of bracket means 51, may be covered by a padding material if desired.

What is claimed is:

1. A stand adapted for attachment to a tree or post, comprising, in combination, a flexible, elongated support means adapted to form a variable sized, closed loop and to be placed in circumferential relationship with a tree or post, and a stand portion, comprising:

a substantially vertically deposed support frame, said support frame further including near the upper terminus thereof an attachment means adapted to be releasably attached to said loop, said attachment means comprising one or more projections extending laterally behind said support frame and angularly downward to describe one or more tapered faces adapted to contact said loop and one or more rear edges adapted to contact the surface of the tree or post such that downward force from the weight of the stand portion increasingly tightens the loop and causes the rear edge of the attachment means to press more tightly against the tree or post, or a platform means attached to the support frame near the lower terminus thereof.

2. A stand according to claim 1 wherein the platform means is rotatably attached to the support frame and held in substantially horizontal position in front of said support frame when in use by a bracing means connected to said support frame.

3. A stand according to claim 2 additionally comprising a seat means rotatably attached to the support frame near the upper terminus thereof and adapted to be held in substantially horizontal position above the platform in front of the support frame when in use.

4. A stand according to claim 2 wherein the platform bracing means is adjustable so that the platform may be raised or lowered from the horizontal plane.

* * * * *